United States Patent Office 3,468,999
Patented Sept. 23, 1969

3,468,999
METHOD OF MAKING COATED ARC WELDING ELECTRODES
Lars Hilding Hillert, Goteborg, Sweden, assignor to Elektriska Svetsningsaktiebolaget, Goteborg, Sweden, a corporation of Sweden
No Drawing. Filed Sept. 7, 1965, Ser. No. 485,588
Claims priority, application Sweden, Sept. 7, 1964, 10,698/64
Int. Cl. B29c 25/00; B29f 3/10
U.S. Cl. 264—174                          6 Claims

ABSTRACT OF THE DISCLOSURE

A method of making a coated welding electrode in which a pasty compound of powdered welding flux constituents with an admixture of $CrO_3$ is extruded onto a ferrous core at a temperature below 100° C. and subsequently heated to a temperature in the range between 196° C. and 600° C.

---

This invention relates to the manufacture of coated arc welding electrodes by the method in which a plastic, preferably moistened mixture of powdered welding flux constituents is extruded onto a wire or rod of iron or steel at a temperature not exceeding 100° C. The wire or rod is usually massive but may also consist of a tube or sheath of steel enclosing a filling or core of powdered constituents such as powdered metals or alloys, fluxing agents, arc stabilizing agents, etc.

In a well known and widely adopted process of this kind the powdered coating constituents are mixed with potassium or sodium silicate solution prior to the extrusion. After the extrusion the electrodes are submitted to a drying process, usually at elevated temperatures. The alkali metal silicate is an excellent bonding agent, but has the sometimes serious disadvantage of imparting to the coating a tendency to absorb humidity out of the atmosphere. Moreover, the silicon content of the alkali metal silicate is metallurgically undesirable in some kinds of electrodes, as some elementary silicon may be reduced out of the slag and enter the weld metal. The alkali content of the alkali silicate may also be undesirable, for instance when it is desired to keep the content of electron emitting agents of the coating down to a minimum.

In the British patent specification No. 713,381 it is proposed to employ a hydrophobic, low melting, water-insoluble glass as a bonding agent in electrode coatings. The complex glasses specified, which consist of nine or ten fused oxides and fluorides, necessitate a heating of the coating to about 600° C. or more. Temperatures of this order are, however, inconveniently high and may have injurious effects on the solid constituents of the coating.

The invention has for its principal object to provide an improved method of the kind specified in the first paragraph above in which the disadvantages of the existing methods referred to are avoided. According to a principal feature of the invention, the extrusion mixture is made to include chromium trioxide ($CrO_3$), and the coated electrodes are heated to a temperature exceeding the melting point (196° C.) of the chromium trioxide. The chromium trioxide may be supplied either in the form of powdered chromium trioxide or in the form of a watery solution of chromium trioxide.

In the method according to the invention it is possible to do entirely without alkali metal silicate in the coating composition. The invention includes, however, the possibility of using alkali metal silicate as a bonding agent in addition to the chromium trioxide. The proportion of alkali metal silicate (by weight) should, however, not exceed the proportion of chromium trioxide in the coating. A substantial reduction of the humidity absorption of the coating is obtained in spite of the presence of the alkali metal silicate. A probable explanation of this fact is that the chromium trioxide on fusing effects a sealing of the fine pores of the coating, resulting in a suppression of the humidity absorption.

In order to render the powdered coating sufficiently plastic for the extrusion, it is preferably mixed with water (or, if desired, with an alkali metal silicate solution or a chromium trioxide solution). If required, the composition may also contain usual plasticizing agents such as china clay, bentonite, precipitated titania, cellulose ester or alginate. The invention also includes the possibility of extruding a water-free coating compound, which may for instance contain a proportion of paraffin wax or other waxy plasticizers capable of being completely vaporized by heating to a temperature not exceeding 450° C.

The invention does not include a method in which the coating compound is extruded at a temperature equal to or exceeding the melting point of the chromium trioxide.

The proportion of chromium trioxide present in the coating composition should be chosen with due regard to the grain size distribution in said composition and to the properties required of the slag. In coatings containing no other bonding agent, such as alkali metal silicate, a minimum content of 1% of $CrO_3$ (or a corresponding proportion of chromic acid) must be employed in order to provide a sufficient bonding action. If no other reasons demand that the proportion of $CrO_3$ must be kept down to a minimum, a proportion of at least 3 or 4 percent of $CrO_3$ is to be preferred. On the other hand, increasing the proportion of $CrO_3$ above 10% results in no further improvement of the mechanical strength or reduction of the humidity absorption. Proportions above 10% may, however, be employed in coatings required to provide a slag having a high content of chromium oxide.

Chromium trioxide is not stable at higher temperatures, but is decomposed at temperatures exceeding 250° C. into lower oxides and oxygen. At temperatures from about 415° C. and upwards, only the chromium oxide $Cr_2O_3$ is stable. In one form of the method according to the invention, the coated electrodes are heated to a temperature in the range between about 200° C. and 250° C., whereby the chromium trioxide is fused but does not decompose. The coatings of the finished electrodes will in that case contain solidified chromium trioxide as a binding agent. It is, however, also within the invention to submit the coated electrodes to a temperature above the decomposition temperature (250° C.) of the chromium trioxide, preferably at least 415° C., whereby the chromium trioxide is converted into chromium oxide ($Cr_2O_3$), which is insoluble in water and chemically inert at ordinary temperatures. To achieve said result, a temperature in the range between 420 and 450° C. is advantageously employed. In special cases, particularly when comparatively low contents of $CrO_3$ have to be used, for instance 2 percent or less, heating to temperatures exceeding 450° may result in some improvement of the mechanical strength or resistivity of the coating. Temperatures exceeding 600° C. are, however, to be avoided. It is also possible in the method according to the invention to choose the composition of the coating compound in such a way that at least one constituent thereof is capable of reacting with the chromium trioxide to form a new compound, more particularly a chromate, dichromate, or chromite. Examples of such constituents are copper oxides (cupric oxide or cuprous oxide) and alkaline earth metal oxides or carbonates. To effect the desired reaction the coated electrodes may be submitted to a heat treatment at such a temperature and during such a time that at least a substantial part of the chromium trioxide (or of the thermal decomposition products of the chromium trioxide) are caused to react with the other reactive constituent or constituents.

EXAMPLE

A mixture of the following dry constituents are mixed with a proportion of water sufficient to render the mass extrudable:

| | Percent |
|---|---|
| Diopside | 75 |
| Bentonite | 4.5 |
| Rutile | 10 |
| Ferrosilicon | 5 |
| Chromium trioxide | 5 |
| Cellulose ester | 0.5 |
| | 100 |

The proportions are by weight. The compound is extruded in an electrode press onto core wires of austenitic stainless steel (18% Cr, 8% Ni), the diameter of which is 4 mm. The diameter of the extrusion nozzle is 5.4 mm. The coated electrodes are first dried in order to remove the major part of the water of the coating and then heated in a furnace to about 450° C. When said temperature has been reached, heating of the furnace is turned off and the electrodes are allowed to remain in the furnace until their temperature has dropped to about 100° C.

The invention may also be applied to the manufacture of long wire electrodes for automatic welding supplied in the form of coils. Such electrodes may, for instance, have a coating of the wire-sheathed type (that is, with one or more wires flyspun around a core wire, the spaces being filled with flux). It is also possible to apply the invention to the manufacture of electrodes the coating of which consists of two or more portions having dissimilar compositions, for instance electrodes having a coating comprising two concentric layers, at least one of which is made by the method according to the invention. Both layers may be extruded simultaneously, as known per se.

I claim:

1. In the method of making coated arc welding electrodes by the extrusion at a temperature not exceeding 100° C. of a pasty, preferably moistened compound of powdered welding flux constituents onto a core wire of steel, the steps of incorporating with the coating compound a minor proportion of a binding agent consisting essentially of chromium trioxide wherein the said trioxide amounts to at least 1% by weight of the coating compound mixture and subjecting the extruded electrodes to a temperature below 600° C. but exceeding the melting point (196° C.) of the chromium trioxide.

2. A method as claimed in claim 1 in which the electrodes are heated to a temperature not exceeding 250° C., so that substantially no chemical change of the chromium trioxide occurs.

3. A method as claimed in claim 1 in which the electrodes are heated to a temperature exceeding 250° C., whereby the chromium trioxide is at least partially converted into lower oxides.

4. A method as claimed in claim 1 in which the electrodes are heated to a temperature of at least 415° C., preferably not exceeding 450° C., whereby the chromium trioxide is completely converted into chromium oxide ($Cr_2O_3$).

5. A method as claimed in claim 1 in which a proportion of chromium trioxide amounting to 1 to 10% of the weight of the coating compound is incorporated with said compound.

6. The method of claim 5 in which the proportion of chromium trioxide ranges from about 3 to 10%.

References Cited

UNITED STATES PATENTS

| 2,697,159 | 12/1954 | Donahey | 264—174 |
| 3,053,693 | 9/1962 | Schuster et al. | |
| 2,544,334 | 3/1951 | Linnert | 148—26 |
| 3,272,963 | 9/1966 | Wasserman et al. | 117—205 |

ROBERT F. WHITE, Primary Examiner

J. R. THORLOW, Assistant Examiner

U.S. Cl. X.R.

106—313; 148—26; 264—235